Feb. 16, 1960 D. S. NEE 2,925,219

BINARY NUMBER MODIFIERS

Filed Dec. 22, 1953 3 Sheets-Sheet 1

INVENTOR
David S. Nee.
BY
Robert W. Hampton

Feb. 16, 1960 D. S. NEE 2,925,219

BINARY NUMBER MODIFIERS

Filed Dec. 22, 1953 3 Sheets-Sheet 2

INVENTOR
David S. Nee.
BY
Robert W. Hampton

Feb. 16, 1960 D. S. NEE 2,925,219

BINARY NUMBER MODIFIERS

Filed Dec. 22, 1953 3 Sheets-Sheet 3

INVENTOR
David S. Nee.
BY
Robert W. Hampton

United States Patent Office 2,925,219
Patented Feb. 16, 1960

2,925,219

BINARY NUMBER MODIFIERS

David S. Nee, Palo Alto, Calif., assignor to Marchant Research, Inc., a corporation of California Application December 22, 1953, Serial No. 399,767

3 Claims. (Cl. 235—165)

The present invention relates to electronic calculators and more particularly to binary number modifiers for use in such calculators.

In electronic calculators, the binary system of numeration is often employed as the radix of calculation, because electronic devices are most readily adapted to an On or Off, 0 or 1, mode of operation. However, in some calculators, it is convenient to enter values and to read out results in the conventional decimal system. In calculators of this type which have a decimal keyboard, a decimal readout system, and an internal binary accumulator register, it is often desirable to ordinally shift the accumulator register relative to the keyboard and the readout system. When the multidigit number, or "word," standing in a decimal accumulator register is shifted one decimal order to the left, the word is in effect, multiplied by ten, which may be done by adding a "0" to the righthand end of the word contained in the register. But in a calculator of the type referred to above, having a binary accumulator register, a left shift of a decimal order cannot be performed by the ordinary expedient of adding a "0"; instead, the entire word must be multiplied by the binary equivalent of a decimal ten, or "1010."

It is therefore a primary object of the present invention to provide a simple, inexpensive circuit for performing binary multiplication.

Another object of the invention is to provide improved means for modifying binary words according to any desired multiplication code.

Further objects of the invention are:

To provide improved means for multiplying a binary word by the binary value 1010;

To provide improved means for multiplying a binary multiplicand by a decimally selected multiplier to produce a binary result.

To shift a binary word through $n$ parallel channels, each channel $k$ containing means for delaying the word by $D_k$ digits; to arithmetically combine the delayed binary words; and to shift the combined word into a register through means for delaying the combined word by $D_0$ digits, where $D_k$ and $D_0$ are any predetermined positive integers, including 0.

The underlying principle of the present invention is therefore the shifting of a binary word from a register through a series of parallel channels, each channel having a characteristic digital delay; arithmetically combining the delayed words; and shifting the combined word back into the register with or without a further digital delay.

Other objects and principles of the invention will appears from the following description, reference being made to the accompanying drawings, in which.

The structure and operation of the invention will be set forth following a description of the circuit elements and units employed therein.

CIRCUIT ELEMENTS

*Bistable circuit*

One of the basic elements employed in the present invention is a circuit having two stable states of operation such, for example, as the well-known Eccles-Jordan vacuum tube trigger circuit, described in "Theory and Application of Electron Tubes" by H. J. Reich. In one of its simplest forms, a trigger circuit comprises two triode vacuum tubes in which the grid of each tube is cross-coupled to the anode of the other tube through a respective network comprising a resistor in parallel with a capacitor. Such a circuit has two stable operating conditions, namely, with either of the two tubes conducting and its companion tube non-conducting.

Figure 1:
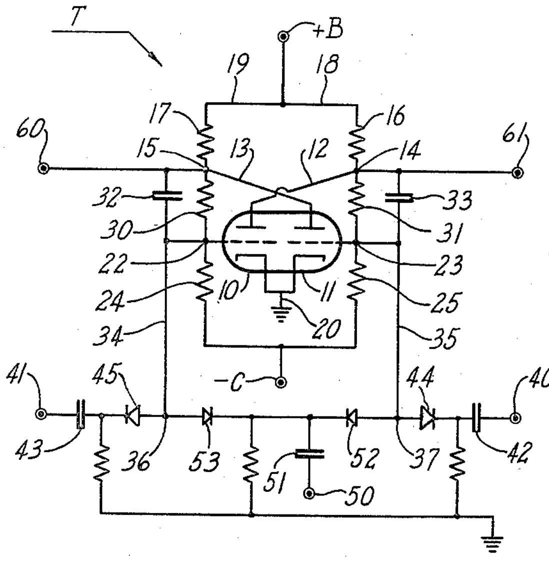
Fig. 1 is a wiring diagram of a typical bistable circuit as employed in the invention.

A modification of the Eccles-Jordan circuit is shown as T in Fig. 1. The trigger circuit T comprises two vacuum tube triodes 10 and 11, shown for convenience as the two sections of a twin triode. The lefthand tube 10 is hereinafter called the "0 side," and the trigger is said to be "reset" when the 0 side is conducting. The righthand tube 11 is hereinafter called the "1 side," and the trigger is said to be "set" when the 1 side is conducting.

The anode of the 0 side of the trigger is connected by a lead 12, a junction 14, a resistor 16, and a lead 18 to a terminal +B which is a source of positive potential. Similarly, the anode of the 1 side of the trigger is connected by a lead 13, a junction 15, a resistor 17, and a lead 19 to the terminal +B. The cathodes of both sides are connected by a common cathode lead 20 to ground.

The grid of the 0 side, hereinafter called the "0 grid," is connected through a junction 22 and a resistor 24 to a terminal −C which is a source of negative grid bias. The 1 grid is similarly connected through a junction 23, and a resistor 25 to the terminal −C. The 0 grid is also connected by means of junction 22, a resistor 30 in parallel with a capacitor 32, and junction 15, to the 1 anode. The 1 grid is similarly connected by means of junction 23, a resistor 31 in parallel with a capacitor 33, and junction 14 to the 0 anode.

A "set" input terminal 41 is connected by a capacitor 43, a diode 45, a junction 36, a lead 34, and junction 22, to the 0 grid, and a "reset" input terminal 40 is connected by a capacitor 42, a diode 44, a junction 37, a lead 35, and junction 23, to the 1 grid. A "symmetrical" input terminal 50 is connected through a capacitor 51, two diodes 52 and 53, and junctions 37 and 36, respectively, to both the 0 and 1 grids.

A negative pulse applied to the symmetrical terminal 50 invariably reverses the trigger as follows: Assuming that the 0 side is initially conducting, a negative pulse applied to terminal 50 is transmitted through diode 53 to the 0 grid, but is blocked from the 1 grid for the following reasons.

Since the 0 side is conducting, junction 23 is at a relatively low potential. The circuit parameters and the potential value of the grid bias source —C are so chosen that the relatively low potential of junction 23 is below ground potential by an amount at least equal to the value of the input pulses applied to the terminal 50. Therefore, the potential of the lefthand side of diode 52 cannot drop below the potential of the righthand side of that diode in response to the pulse applied to terminal 50, and the pulse is blocked. Similarly, if the 1 side is conducting, diode 53 blocks a pulse applied to terminal 50.

The negative pulse applied to the 0 grid decreases the conduction of the 0 side, so that the potential at junction 14 rises. This rise in potential is coupled by capacitor 33 to the 1 grid to initiate conduction in the 1 side. The conduction of the 1 side lowers the potential at junction 15, thereby lowering the 0 grid potential to further reduce the conduction of the 0 side. Conduction increases in the 1 side and decreases in the 0 side until a stable state is reached with the 1 side conducting at saturation and the 0 side fully cut off. Each subsequent negative pulse applied to terminal 50 similarly reverses conduction from one side to the other.

A negative pulse applied to the set terminal 41 sets the trigger to 1 if it is conducting on the 0 side, but has no effect on the trigger if it is already set to 1. Assuming once again that the trigger is conducting on the 0 side, a negative pulse applied to terminal 41 is coupled by capacitor 43, diode 45, and lead 34 to the 0 grid. Diode 53 blocks this pulse from the 1 grid. The negative pulse on the 0 grid causes conduction to reverse from the 0 side to the 1 side in the manner hereinbefore described. Similarly, a negative pulse applied to the reset terminal 40 resets the trigger to 0 if it is conducting on the 1 side, but has no effect on the trigger if it is already reset to 0.

The trigger circuit is adapted to control other devices by means of the changing potential levels at junctions 14 and 15. When the trigger stands reset to 0, the potential at junction 15 is relatively high while the potential at junction 14 is relatively low, the converse being true when the trigger stands set to 1. A pair of control output terminals 60 and 61, which are connected to junctions 15 and 14 respectively, are used for applying these potentials to other devices.

Figure 2:
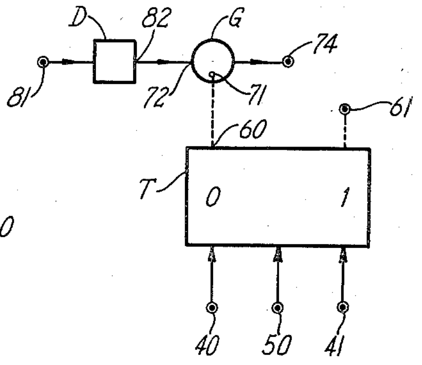
Fig. 2 is a block diagram showing typical relationships between the circuits shown in Figs. 1, 3 and 4.

In Fig. 2, the trigger circuit T is shown as a rectangle with the symmetrical input terminal 50 at the bottom center of the rectangle and the reset and set input terminals 40 and 41 at the bottom left and bottom right of the rectangle, respectively. The control output terminals 60 and 61 are shown at the top left and top right of the rectangle, respectively.

GATE

Figure 3:
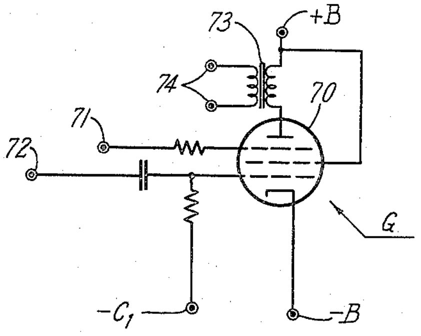
Fig. 3 is a wiring diagram of a typical gate as employed in the invention.

A second element employed in the present invention is a controllable transducer such as a gate, an example of which is the well-known pentode gate shown as G in Fig. 3. Gate G comprises a pentode tube 70 which is normally biased well below cutoff by means of a control grid bias source $-C_1$. The bias of tube 70 can be raised to slightly below cutoff by a single arming control comprising a terminal 71 which is connected to the suppressor grid of the tube. In the present invention, each gate G is controlled by a trigger circuit, terminal 71 of the gate being connected to the appropriate control output terminal 60 or 61 of the trigger circuit (Fig. 1). When the control potential of the related output terminal 60 or 61 is low, tube 70 is biased well below cutoff, and the gate is said to be "closed"; conversely, when the control potential becomes high, the bias of the tube 70 is raised to slightly below cutoff, and the gate is said to be "armed." Gate G is interrogated by positive pulses applied to a terminal 72 which is capacitively coupled to the control grid of the tube. If the gate is interrogated while it is closed, tube 70 remains cut off; but if the gate is interrogated while it is armed, the tube conducts, thereby energizing the primary winding of a pulse transformer 73 in the discharge circuit of the tube. According to the desired polarity of an output pulse from the gate, such a pulse may be taken from either of a pair of terminals 74 which are connected to opposite ends of the secondary winding of transformer 73.

In Fig. 2, a gate is shown as a circle having within it a smaller circle connected to the control output terminal 60 of the trigger circuit T. This represents a typical arming connection from a trigger, and indicates that gate G is armed when and only when the trigger T stands reset to 0. In the accompanying drawings, control leads are shown as broken lines, whereas pulse leads are shown as solid lines.

DELAY CIRCUIT

Figure 4:
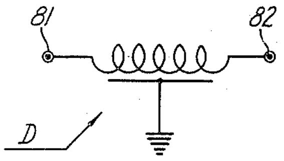
Fig. 4 is a schematic diagram of a typical delay circuit as employed in the invention.
Figure 5:
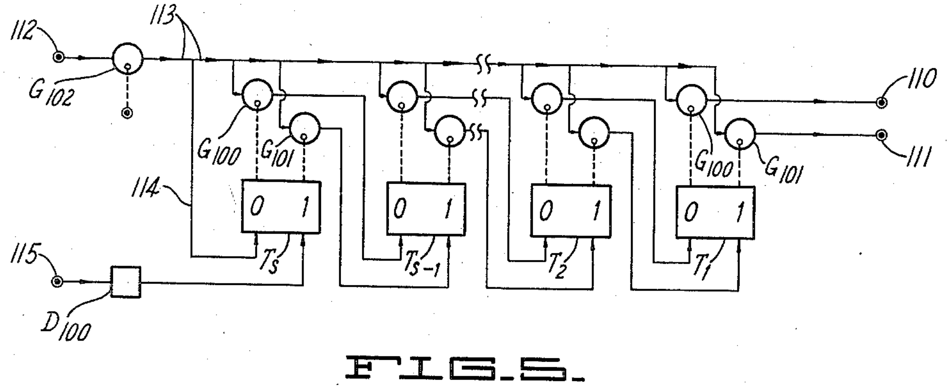
Fig. 5 is a block diagram of a typical shifting register as employed in the invention.

A third element employed in the invention is a delay circuit, a typical example of which is shown schematically in Fig. 4 as a distributed parameter delay line of the type disclosed in Fig. 5 of the U.S. Patent No. 2,467,857, issued April 19, 1949, to J. H. Rubel et al., to which reference is made for a full description. It is to be understood that other delay circuits, such as lumped parameter delay lines may be employed. Pulses impressed upon an input terminal 81 of delay line D are delayed a few microseconds or a fraction of a microsecond and appear at an output terminal 82. In Fig. 2, a delay circuit D is shown as a small square.

CIRCUIT UNITS

*Shift register*

A first unit employed in the present invention is a binary shift register, a standard example of which is shown in Fig. 5. This register comprises a plurality of value-storing stages, the number of stages being determined by the number of digits in the longest binary word that is to be stored in the register. By means of shifting the value in each stage to the next lower stage, the register is adapted to receive binary words from, or transmit them to other units of the calculator.

Referring to Fig. 5, the register comprises *s* stages, the stages of higher significance being shown on the left. Each stage includes a respective trigger circuit $T_1$—$T_s$. Each trigger controls a pair of shift gates $G_{100}$ and $G_{101}$, the former being armed when the trigger stands at 0 and the latter being armed when the trigger stands at 1. A continuous series of timing pulses are applied to a terminal 112 from an appropriate pulse generator, the space between two consecutive timing pulses being designated a "digit interval." The timing pulses on terminal 112 interrogate a gate $G_{102}$ which is armed during predetermined digit intervals for passing groups of timing pulses, or "shift" pulses, to a shift bus 113 which is connected to the interrogation input of each shift gate $G_{100}$ and $G_{101}$. The output terminal of each gate $G_{100}$ is connected to the reset input terminal of the trigger in the next lower stage, while the output terminal of each gate $G_{101}$ is connected to the set input terminal of the trigger in the next lower stage. Therefore, each shift pulse passes through the armed gate $G_{100}$ or $G_{101}$ of each stage and resets or sets the next lower stage accordingly. Although a trigger may be reversed by a shift pulse from the next higher stage, it requires a finite time to reverse; this permits the related shift gates to pass a shift pulse before the reversal occurs.

A binary word may be shifted into or out of the register digit-by-digit, starting with the lowest order digit.

Input words are received in the form of pulse trains, wherein the presence or absence of a pulse during each digit interval represents a 1 or a 0, respectively. The shift pulse that occurs at the beginning of each digit interval resets the highest stage trigger $T_s$ to 0, through a lead 114. Simultaneously with the occurrence of each shift pulse, a digit 1 or 0 of the input word is applied (by the presence or absence of a pulse) to an input terminal 115 which is connected through a delay circuit $D_{100}$ to the set input terminal of $T_s$. Therefore, $T_s$ is always reset to 0 by a shift pulse at the beginning of each digit interval, but may be set to 1 during that interval by the receipt of a delayed pulse from terminal 115, representing an input digit of 1. If no pulse is applied to terminal 115 during a given digit interval, $T_s$ remains reset to 0.

For shifting a word out of the register, a pair of output terminals 110 and 111 are provided, these being the output terminals of the lowest stage shift gates $G_{100}$ and $G_{101}$, respectively. From the previous description of the shift gates, it is seen that a pulse appears on terminal 110 for each digit 0 that is shifted out of the lowest stage, and a pulse appears on terminal 111 for each digit 1 that is shifted out of that stage. In the present invention, only the 1's output (from terminal 111) is employed as an input to the other devices, a 0 being represented by the absence of a pulse.

ADDER

Figure 6:
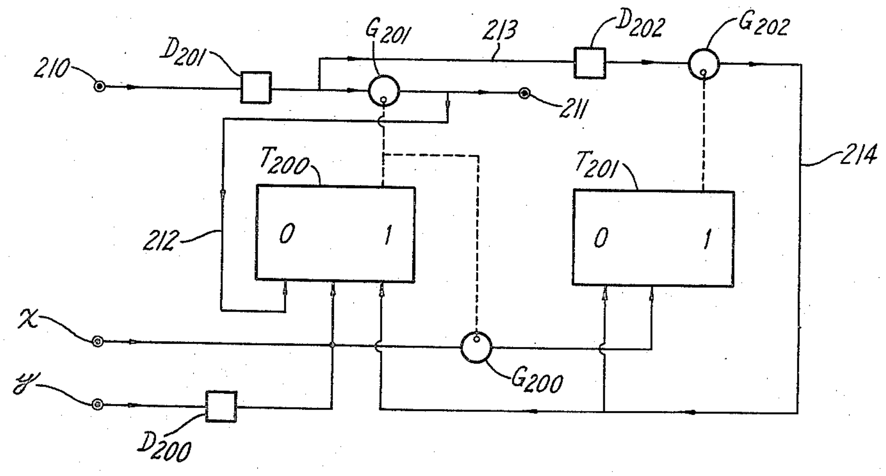
Fig. 6 is a block diagram of a typical adder as employed in the invention.

A second unit employed in the present invention is an adder, a typical example of which is shown in Fig. 6. This is an upcount adder which is shown also in Fig. 6 of the copending application Serial No. 344,025, filed March 23, 1953, by G. B. Greene, now abandoned, reference being made to the latter application for a full description of the adder per se.

Briefly, the adder comprises a two-stage pulse counting circuit, wherein a first stage includes a trigger $T_{200}$ and a second stage includes a trigger $T_{201}$. $T_{200}$ and $T_{201}$ may be triggers of the type hereinbefore described, each having two stable states representing the digits 0 and 1, respectively, both triggers being initially in the 0 state.

Each of two pulse sequence operands $x$ and $y$ is entered into the adder by applying to the symmetrical input of $T_{200}$ a respective pulse representing each digit 1, so that the presence or absence of a pulse from either operand source represents a 1 or a 0 operand digit, respectively, during each of a series of digit intervals. The $x$ operands are received directly through a terminal $x$, while the $y$ operands are received through a terminal $y$ and a delay circuit $D_{200}$ which prevents the $x$ and $y$ operands from arriving simultaneously at the input to $T_{200}$.

A gate $G_{200}$, which is armed by the 1 condition of $T_{200}$, is interrogated by all operand pulses and has its output connected to the symmetrical input of $T_{201}$. If an operand pulse is received when $T_{200}$ stands set to 1, the pulse is passed through $G_{200}$ and reverses $T_{201}$ to store the resulting carry digit. Therefore, following the entry of both of a columnar pair of operand digits, the state of $T_{200}$ represents the sum of the digits and the state of $T_{201}$ represents the presence or absence of a resulting carry digit.

The sum digit which occurs during each digit interval may be read out to any other unit by means of a gate $G_{201}$ which is armed by the 1 state of $T_{200}$. Simultaneously with the receipt of each pair of operand digits (represented by the presence or absence of pulses) at terminals $x$ and $y$, a timing pulse is applied from some appropriate element of the calculator to a terminal 210, and through a delay circuit $D_{201}$ to the input of $G_{201}$. Delay circuit $D_{201}$ is of such a value as to insure that each timing pulse interrogates $G_{201}$ after both operand digits have been entered and $T_{200}$ has assumed a stable state in response to any operand pulses. If $T_{200}$ stands at 1 when $G_{201}$ is interrogated, the timing pulse is passed through $G_{201}$ and appears at an output terminal 211, thereby representing a sum digit of 1 during the corresponding digit interval. If $T_{200}$ stands at 0 when $G_{201}$ is interrogated the timing pulse is blocked, so that no pulse appears at terminal 211, representing a sum digit of 0 during the corresponding digit interval.

Any output pulse from $G_{201}$ (representing a sum digit of 1) resets $T_{200}$ to 0 through a lead 212, thereby, in effect, cancelling the sum digit of 1 stored in $T_{200}$, and preparing $T_{200}$ to receive the next columnar pair of operand digits. However, if a carry digit of 1 is stored in $T_{201}$ during a given digit interval, this digit must be shifted to $T_{200}$ to prepare for the receipt of the next pair of operand digits. The carry digit is shifted as follows:

Each timing pulse, after passing through $D_{201}$, is carried by a lead 213 through a further delay circuit $D_{202}$ to the input of a gate $G_{202}$ which is armed by the 1 state of $T_{201}$. If $G_{202}$ is armed (representing a stored carry digit of 1) when it receives a pulse from $D_{202}$, it passes that pulse to a lead 214 where it resets $T_{201}$ to 0 (cancelling the carry digit from $T_{201}$) and sets $T_{200}$ to 1 (shifting the carry digit to $T_{200}$). Delay circuit $D_{202}$ is provided in order that the carry shift pulse on lead 214 cannot operate on $T_{200}$ and $T_{201}$ until the necessary time has been allowed for a possible pulse on lead 212 to reset $T_{200}$ to 0.

In summary, each pair of operand digits is counted by $T_{200}$, with any carry digit being stored in $T_{201}$. The sum digit is read out of $T_{200}$ which is thereafter reset if the sum digit is a 1. Finally, the carry digit of 1, if any has occurred, is shifted from $T_{201}$ into $T_{200}$.

WORD MODIFIER

The word modifier of the present invention includes a shift register into which a binary word is initially shifted. A series of $n$ parallel delay channels connect the shift register output to an adder matrix. Each channel $k$ has a predetermined delay characteristic of $D_k$ digit intervals, where $D_k$ may be any integer, including 0. The adder matrix receives the delayed word as a distinct operand from each channel, additively combines these operands to produce a new binary word, and returns the new word to the shift register after an additional delay of $D_0$ digit intervals. $D_0$ also may be any integer, including 0.

Each digit interval for which the word is delayed in a given channel is equivalent to a left shift of the word by a single binary place, i.e., a multiplication by a decimal 2. Since the binary word may be delayed any predetermined number of digit intervals $D_k$ in each channel, the output from the adder matrix is the sum of the $n$ delayed words, each word, in effect, being multiplied by $2^{D_k}$. The circuit is therefore capable of modifying a binary word by summing $n$ multiplications of the word, each multiplication being by a predetermined power of 2.

Figure 7:
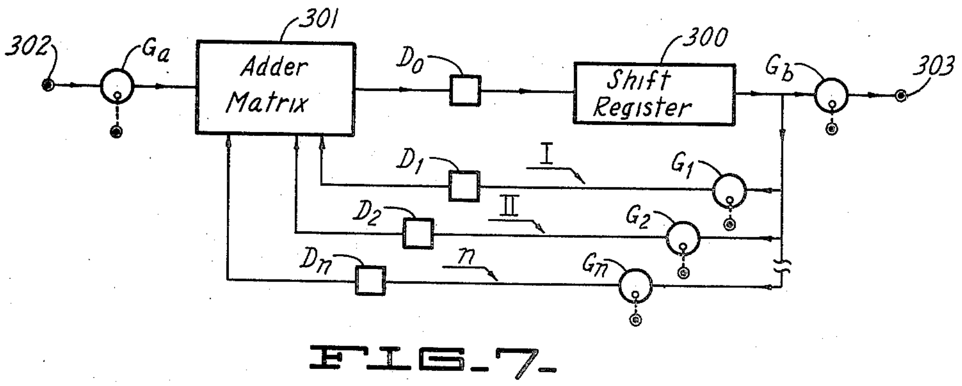
Fig. 7 is a block diagram of the general binary word modifier.

Referring to Fig. 7, a shift register 300, which may be of the type hereinbefore described, initially contains a binary word that is to be modified. The output of register 300 may be operatively connected in parallel to each of $n$ channels I–$n$ through a respective gate $G_1$–$G_n$, by arming that gate. Each channel I–$n$ contains a respective delay circuit $D_1$–$D_n$ which may have a delay time equal to any integral number of digit intervals $D_k$. Each delay channel $D_1$–$D_n$ terminates as an operand input to an adder in an adder matrix 301. If adders of the type shown in Fig. 6 are used (each being able to receive two operands), there is one adder provided in a first bank for each two channels, plus one extra adder if the number of channels is odd. The adder outputs from the first bank, which constitute intermediate sums, are entered as operands into a second bank of adders. Additional banks of adders are similarly pyramided until there is a single output which in the total sum of the delayed words from all of the channels I–$n$. Since each channel $k$ may delay the binary word by any integral number of digit intervals $D_k$, the output sum from the adder matrix is equal to $$\sum_{k=1}^{n}[2^{D_k}]w=[2^{D_1}]w+[2^{D_2}]w+ \ . \ . \ . \ [2^{D_n}]w$$

The output from the adder matrix 301 is returned to the input of shift register 300 through a delay circuit $D_0$ which, like delay circuits $D_1$–$D_n$, may delay the word passing through it by any integral number of digit intervals $D_k$. This provides a left shift, i.e., a multiplication by a predetermined power of 2, of the entire sum output from the adder matrix, so that the input to the shift register equals $$[2^{D_0}]\sum_{k=1}^{n}[2^{D_k}]w$$

It is to be understood that the adder matrix may employ adders other than the type shown in Fig. 5. For example, the algebraic adders shown in Figs. 7 and 8 of the aforenamed application Serial No. 344,025 may be used, as well as any of the well-known pulse coincidence, diode matrix or other types of pulse sequence adders.

A word may be initially entered into the shift register 300 through the adder matrix. An input terminal 302 is connected through a normally closed gate $G_a$ to the input of an adder in the matrix. A word may be shifted out of register 300 through a normally closed gate $G_b$, and an output terminal 303, gate $G_b$ being connected to the register output.

LEFT SHIFT CIRCUIT

The word modifier of the present invention may be employed specifically as a left shift circuit which is adapted for multiplying a binary word $w$ standing in the shift register by a decimal 10, or a binary 1010, this being the equivalent of shifting the word one decimal order to the left. The output of this shift register is transmitted to a single adder through two channels having delays of 0 and 2 digit intervals, respectively, i.e., multiplication factors of 1 and 4 respectively. The adder combines the delayed words from the two channels to produce a sum of $w+4w=5w$. The adder output is then fed to the shift register through a further delay circuit having a delay of 1 digit interval, i.e., a multiplaction factor of 2, so that the register receives the value $2\times5w$, or $10w$, which is equivalent to a left shift of one decimal order.

Figure 8:
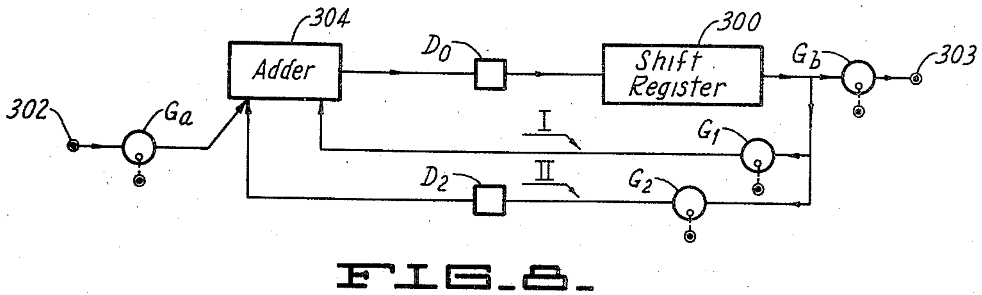
Fig. 8 is a block diagram of the left shift circuit.

Referring to Fig. 8, the output of shift register 300 is entered into each of two parallel delay channels I and II through a respective gate $G_1$ and $G_2$. Channel I has a delay time of 0 digit intervals (a multiplication factor of 1), and is therefore shown without a delay circuit. Channel II includes a delay circuit $D_2$ having a delay time of 2 digit intervals (a multiplication factor of 4). Each channel I and II terminates as an operand input to an adder 304, the output of which is transmitted to the shift register input through a delay circuit $D_0$ having a delay time of 1 digit interval (a multiplication factor of 2). Therefore, a word $w$, originally stored in register 300, is shifted through channels I and II which produce operands of $w$ and $4w$, respectively; these operands are entered into adder 304 and are therein combined to produce a sum of $5w$; and this sum is returned to register 300 through delay circuit $D_0$ which multiplies the adder output by 2. Thus, register 300 finally receives the value $10w$, this being the original word $w$ shifted one decimal order to the left.

In the present circuit, input words from terminal 302 may be entered into the adder through the same input as channel II without causing any interference between two operands. Thus, when the circuit is employed for left shifting, the two adder operands arrive from channels I and II, gate $G_a$ being closed; and if it is desired to employ the circuit for adding an input word to a word standing in register 300, the two operands arrive from channel I and terminal 302, gate $G_2$ on channel II being closed.

DECIMAL MULTIPLIER

Figure 9:
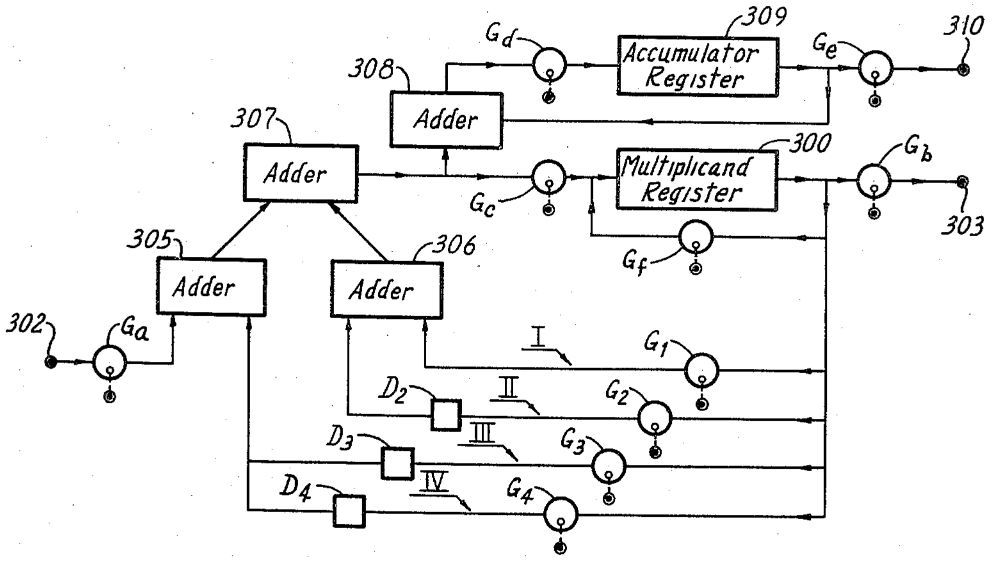
Fig. 9 is a block diagram of the decimal multiplier circuit.

The word modifier of the present invention may also be employed for multiplying the word standing in the shift register by any decimal digit or multidigit decimal word. Referring now to Fig. 9 for this application of the circuit, the output of a first shift register (designated the "multiplicand register" and corresponding to the single register in the previous embodiments), is transmitted to an adder matrix through four delay channels having delay values of 0, 1, 2 and 3 digit intervals, respectively, i.e., multiplication factors of 1, 2, 4 and 8, respectively. Any decimal multiplier digit may be selected by enabling a combination of channels whose multiplication factors collectively equal the selected decimal digit, each channel being enabled by arming its related gate $G_1$–$G_4$. Since the multiplication factors of channels I–IV are 1, 2, 4 and 8, respectively, decimal multiplier digits may be selected by enabling the channels in accordance with the following code, an X representing an enabled channel.

| | Channel | | | |
|---|---|---|---|---|
| | I | II | III | IV |
| | Multiplication Factor | | | |
| | 1 | 2 | 4 | 8 |
| Decimal Multiplier Digit: | | | | |
| 0 | | | | |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |
| 10 | | X | | X |

It is to be understood that the above code is not unique in being applicable to the present circuit. Numerous other "binary-decimal" codes which are well-known in the calculator art may be employed.

A multiplier of 10 is included in the above code to provide for a left shift of one decimal order, which is equivalent to multiplication by a decimal 10.

The adder matrix employed in the decimal multiplier must be capable of receiving operands from any of the four delay channels I–IV as well as from the input terminal 302, making a total of five sources. But referring to the multiplier selection code previously set forth, it is seen that channels III and IV are never enabled concurrently; therefore, their outputs may be joined as a single input to an adder, reducing the effective number of operand sources to four. Accordingly, the adder matrix comprises a first bank of two adders 305 and 306, each for receiving operands from two sources. The respective sum outputs from adders 305 and 306 constitute the two operand inputs to a single second-bank adder 307. The single sum output from adder 307 may be returned to the multiplicand register through a normally closed gate $G_c$, or it may be entered into an accumulator register 309 through an adder 308 and a normally closed gate $G_d$. The output of adder 307 constitutes one operand input to adder 308, and the output of the accumulator register 309 constitutes the other operand input to adder 308; therefore, each partial product that is produced by combining the multiplicand word with a single multiplier digit may be combined in adder 308 with the sum of all the previous partial products. The value standing in the accumulator register may be shifted through a normally closed gate $G_e$ to an output terminal 310.

When the multiplicand word is shifted out of register 300 through gates $G_1$–$G_4$ to combine it with a first multiplier digit, it must also be stored in some appropriate place so that its original value will not be lost, because this value must be shifted and combined with subsequent multiplier digits. It is therefore provided that the multiplicand word be shifted not only through gates $G_1$–$G_4$, but also back into the multiplicand register through a normally closed gate $G_f$.

The multiplying operation comprises an initial cycle for entry of a multiplicand word into the multiplicand register, then alternate multiplying and shifting cycles.

During the initial cycle, gates $G_a$ and $G_c$ are opened, and the multiplicand word is entered into register 300 through terminal 302, gate $G_a$, adders 305 and 307, and gate $G_c$. During each multiplying cycle, the selected gate or gates $G_1$–$G_4$ are opened as well as gates $G_d$ and $G_f$. The multiplicand word is combined with the ordinally selected components of the multiplier digit in the corresponding delay channel or channels I–IV, the delayed words being combined, as previously described, in the adders 305—307 to produce a partial product which is combined in adder 308 with previous partial products stored in register 309, and the accumulated total is entered into register 309 through gates $G_d$. The multiplicand word is circulated into register 300 through gate $G_f$. During the subsequent shifting cycle, gates $G_2$ $G_4$ and $G_c$ are opened. The multiplicand word is shifted to the left one decimal order by passing it through channels II and IV, where it is multiplied by factors of 2 and 8, and then through the adders 305—307, where the delayed words are combined to produce a sum of 10 times the multiplicand word. The sum is then shifted back into register 300 through gate $G_c$.

It is also possible to add an input word to a word stored in either register 300 or 309. For adding the input word to the word stored in register 300, gates $G_1$, $G_a$ and $G_c$ are opened and the addition occurs in adders 305—307. For adding the input word to the word stored in register 309, gates $G_a$ and $G_d$ are opened and the addition occurs in adder 308.

I claim:

1. In a device of the type described including, a register having an input and an output; and means for entering a multidigit word into the register; the combination of: a first normally disabled channel; a second and separate normally disabled channel; means for selectively enabling said channels; a respective connection between the output of the register and each of said channels; means for entering a single digit of said word from the register into both of said channels during each of a series of digit intervals; delay means in only one of said channels for delaying each digit of said word two digit intervals in said one channel; means terminating the two channels for additively combining the delayed word from said one channel and the delayed word from the remaining channel to produce a sum word; means for transmitting the sum word; and delay means within said transmitting means for delaying each digit of the sum word one digit interval.

2. A binary word multiplication system comprising: a register having an input circuit and an output circuit; input means connected to said register input circuit for entering a multidigit binary word multiplicand into said register; adding means for additively combining binary words; first, second, third, and fourth multiplier channels, each of said channels having an input connected to said register output circuit and an output connected to said addition means; first enabling means connected in said first multiplier channel, said first channel being operable when enabled to apply binary representations to said addition means coincident with the occurrence of said representations in said register output circuit; first delay means connected in said second multiplier channel, said first delay means having a delay characteristic corresponding to one digit interval; second enabling means connected in said second multiplier channel, said second channel being operable when enabled to apply binary digit representations to said addition means one digit interval subsequent to the occurrence of said representations in said register output circuit; second delay means connected in said third multiplier channel, said second delay means having a delay characteristic corresponding to two digit intervals; third enabling means connected in said third multiplier channel, said third channel being operable when enabled to apply binary digit representations to said addition means two digit intervals subsequent to the occurrence of said representations in said register output circuit; third delay means connected in said fourth multiplier channel, said third delay means having a delay characteristic corresponding to three digit intervals; fourth enabling means connected in said fourth multiplier channel, said fourth channel being operable when enabled to apply binary digit representations to said addition means three digit intervals subsequent to the occurrence of said representations in said register output circuit; means for selectively enabling said enabling means to correspond to a binary coded decimal multiplier; means for serially shifting said multiplicand into said multiplier channels; and product output means connected to said addition means.

3. A binary word multiplication system comprising: a register having an input circuit and an output circuit; input means connected to said register input circuit for entering a multidigit binary word multiplicand into said register; adding means for additively combining binary words; a plurality of multiplier channels, each channel having an input connected to said register output circuit, an output connected to said addition means, enabling means operable to enable said channel to apply binary digit representations occurring in said register output circuit to said addition means, one of said channels being operable when enabled to apply binary representations to said addition means coincident with their occurrence in said register output circuit, and the remainder of said channels each containing delay means and operable when enabled to apply binary digit representations to said addition means at least one binary digit interval subsequent to the occurrence of said representations in said register output circuit, the delay of each of said channels corresponding to a unique number of binary digit intervals; means for selectively enabling said enabling means to correspond to a multiplier; means for serially shifting said multiplicand into said multiplier channels; and product output means connected to said addition means.

References Cited in the file of this patent

UNITED STATES PATENTS

| | | |
|---|---|---|
| 2,304,495 | Cunningham | Dec. 8, 1942 |
| 2,685,407 | Robinson | Aug. 3, 1954 |
| 2,686,632 | Wilkinson | Aug. 17, 1954 |
| 2,785,854 | Chaimowicz | Mar. 19, 1957 |

FOREIGN PATENTS

| | | |
|---|---|---|
| 733,350 | Great Britain | July 13, 1955 |